United States Patent Office 2,906,743
Patented Sept. 29, 1959

2,906,743

PROCESS FOR PREPARING HALOGEN-CONTAINING POLYOLEFINS

Erich Heitzer, Hofheim (Taunus), Albert Gustav Martin Gumboldt, Frankfurt am Main, Günter Messwarb, Kelkheim (Taunus), and Gerhard Bier, Frankfurt am Main, Germany, assignors to Farbwerke Hoechst Aktiengesellschaft vormals Meister Lucius & Brüning, Frankfurt am Main, Germany, a corporation of Germany No Drawing. Application November 20, 1956
Serial No. 623,310

Claims priority, application Germany November 23, 1955

7 Claims. (Cl. 260—94.9)

When the process for polymerizing lower olefins, especially ethylene, had been discovered, the halogenation products of these compounds, particularly the chlorine and bromine derivatives, were also prepared. Thus, for example, solid, high-molecular polyethylene prepared by the high-pressure process can be converted, in solvents which themselves do not react with chlorine, and with or without the use of pressure, into products of high chlorine content. Suitable solvents or dispersing agents for this purpose are carbon tetrachloride, chloroform, and glacial acetic acid or their mixtures. The best suited is carbon tetrachloride. If solvents that contain hydrogen atoms are used, it must be expected that they will be chlorinated together with the macromolecules.

High-boiling solvents with boiling points above 200° C. are less suitable for this type of reaction because they are hard to remove. The chlorination temperature may vary over wide limits. The chlorination process may be conducted with or without pressure and with the use of light of short wave length, such as is produced by the mercury vapor lamp or the carbon arc lamp. Halogenations have also been carried out in water as a dispersing agent, but the products obtained are usually of lower halogen content than those prepared in organic solvents. Moreover, the absorption of halogen is slower. Sulfuryl chloride, too, has been used as a chlorinating agent for polymeric ethylene in conjunction with ultraviolet light. Valuable synthetics of elastic rubberlike properties may be prepared by sulfochlorinating (simultaneously treating with chlorine and sulfur dioxide) polyethylene.

The known processes for preparing halogen-containing polyolefins refer to polymers prepared by polymerization under high pressures.

The discovery of processes of polymerizing lower olefins at low pressures in the presence of salts of the IVb, Vb and VIb groups of elements of the periodic system and organoaluminum compounds as catalysts in accordance with Belgian Patents 540,459, 533,362, 534,792, and 534,888 resulted in the possibility of preparing, by varying the catalyst system, polymers of widely-varying molecular weight.

The dispersing agents used in these processes are hydrocarbons. When polyolefins are prepared by these processes and subsequently halogenated or sulfochlorinated the polymer must be transferred from the hydrocarbon phase into a phase, for example in carbon tetrachloride, which is suitable for halogenation and sulfochlorination. This transfer from one organic phase into another organic phase is inconvenient and expensive.

It has now been found that halogen-containing, as well as halogen- and sulfur-containing polyolefins, of highly useful properties are prepared by halogenating or sulfohalogenating polyolefins in a halogen-resisting dispersing medium in which polymerization of the olefins to polyolefins can be carried out in the presence of a catalytic mixture of a salt of an element selected from groups IVb, Vb and VIb of the periodic system and an organoaluminum compound with a halogen carrier selected from the group consisting of elementary halogen and a combination of a halogen and sulfur dioxide.

It has been found that the process is particularly useful when carried out on polyolefins prepared according to U.S. Serial No. 603,886, filed August 14, 1956, and German patent application F 18,866, filed November 18, 1955, by carrying out the halogenation process on the polymerization reaction mixture without isolation of the polymer prior to the halogenating treatment with halogen or a combination of halogen and sulfur dioxide. In this manner the same halogen-resisting dispersing medium can be used for both the polymerization and halogenation or sulfohalogenation. It is especially advantageous to carry out the chlorination or simultaneous chlorination and sulfochlorination in accordance with this process.

The preferred dispersing agents are halogen-stable agents, e.g., carbon tetrachloride. With the use of $CCl_4$ low-molecular solid polymers are, under certain conditions, formed during the polymerization period. When fluorine- and chlorine-containing compounds, the boiling point of which is advantageously below 200° C., are used as solvents, e.g., $CF_2Cl$—$CF_2Cl$ or $CFCl_2$—$CF_2Cl$, the products that are obtained are more highly molecular and, under certain conditions, more homogeneous than those prepared with the use of $CCl_4$. Hence, these dispersion media have certain advantages in the preparation of high-molecular polyolefins, because they are readily removed after the halogenation as a result of their lower boiling point.

Halogenation or sulfohalogenation can be carried out without pressure or at higher temperatures and under pressure, e.g., 80–150° C. at 1–30 atmospheres pressure with or without the action of light of short-wave length, and with or without the action of the known halogen transfer agents, e.g., ferric chloride, aluminum chloride, acetone peroxide, etc. This mode of operation in the same solvent constitutes a great technical simplification of the halogenation process. A further advantage of the process in accordance with the invention is that the salts of elements of groups IVb, Vb and VIb of the periodic system and the organoaluminum compounds used as polymerization catalysts are converted into halogen salts at the beginning of the halogenation process and then function as effective halogen transfer agents.

Especially suitable for this process, i. e., polymerization and halogenation or sulfochlorination in the same reaction medium, are unsaturated hydrocarbons having terminal double bonds, e.g., ethylene, propylene, isobutylene, 1-butene, 1-hexene, 1-octene, styrene, α-methylstyrene nuclearly alkylated styrene, etc.

The working-up of dispersions and/or solutions of the halogen-containing polymers is conducted in the usual manner by expelling the solvent or dispersing agent under vacuum, or with the aid of steam, or by precipitation with precipitating agents such as methanol. It is advantageous to add acid acceptors, e. g., soda, in the working-up process.

The resulting halogenated polymers are recovered by centrifugation or suction filtration.

The remaining halogen-containing polymers which, depending on the degree of halogenation or on the degree of polymerization of the polymer, are soft, rubbery and elastic to hard and resilient masses which are suitable as

3 plasticizers, textile assistants, raw materials for lacquers, and synthetics.

The invention is illustrated in the following examples:

*Example 1*

Polymeric propylene having an average degree of polymerization of 22, as it occurs in carbon tetrachloride after polymerization admixed with titanium salts and organoaluminum compounds in the form of a 33% solution, is chlorinated for 13 hours at the boiling point of $CCl_4$ with the use of a reflux condenser, and with stirring and ultraviolet radiation. The viscous solution is added dropwise to boiling water, the $CCl_4$ is distilled, and there remains a solid, white foam which is subsequently ground in a mill with methanol and water. A fine, white powder having a chlorine content of 70.1% is obtained.

*Example 2*

Ethlyene is polymerized in symmetrical tetrachlorodifluoroethane boiling at 92–93° C. with the use of titanium tetrachloride and triethylaluminum. The resulting product has a viscosity of 2.18 ($\eta$ spec./c. in ½% solution in tetrahydronaphthalene at 130° C.) The dispersion, containing 10% solid polyethylene, is subsequently chlorinated for 8 hours at the boiling point of the dispersing agent with the use of a reflux condenser under radiation from the short wave length illumination of a Hereaus immersion lamp. The insoluble product of chlorination is suction-filtered, washed with methanol and water and dried. It contains 65.8% chlorine.

*Example 3*

Polymeric ethylene having an average degree of polymerization of 28, as prepared by polymerization with titanium salts and organoaluminum compounds in accordance with U. S. application Serial No. 603,886, filed August 14, 1956, and German patent application F 18,866, filed November 18, 1955, in the form of a 25% solution in carbon tetrachloride boiling at 76–77° C., is chlorinated for 15 hours at the boiling point of the solvent. During the chlorination the solution is irradiated with light from a mercury vapor lamp. The solution is added to boiling water and the carbon tetrachloride evaporated. The solid residue is worked up as described in Example 1. Chlorine content of product=59.5%.

*Example 4*

Polymeric propylene as it occurs in carbon tetrachloride after polymerization with titanium salts and organoaluminum compounds in the form of a 10% solution is treated slowly with bromine at the boiling point of $CCl_4$ and under ultraviolet radiation. One mole bromine is used per polymer unit (1 atom bromine volatilizes as HBr). The reaction product is decanted into double its volume of methanol and separated from the precipitated bromine product by suction filtration. After reprecipitation the bromine content is 65.7%.

*Example 5*

A 25% solution of the polymer obtained by polymerizing propylene in carbon tetrachloride is treated at the boiling point of carbon tetrachloride with a mixture of one part chlorine and three parts sulfur dioxide under ultraviolet radiation. The reaction product is added to double its volume of isopropyl alcohol; the precipitated sulfochlorinated polypropylene is separated and washed with isopropyl alcohol. Chlorine content=49.5%; sulfur content=4.1%.

*Example 6*

Chlorine is introduced at 400 C. into two liters of an about 5% trichlorotrifluoroethane dispersion of polyethylene as obtained by polymerization with the use of

4 titanium tetrachloride and triethylaluminum (see Example 2). After 15 minutes a sample of filtered polyethylene taken from the chlorination mixture has a chlorine content of 5%.

*Example 7*

To a solution of 4.5 cc. aluminum ethyl sequichloride in 475 cc. of 1,1,2,2-tetrachloroethane is added dropwise while stirring and adding ethylene 1.0 cc. $TiCl_4$ in 25 cc. af tetrachloroethane. After addition of the $TiCl_4$, the mixed catalyst system was cooled to −15° C. and ethylene addition is continued at the rate of 50 liters per hour while gradually adding a 16% solution of aluminum ethyl sesquichloride. At the end of 7 hours the polymerization is stopped by interrupting the flow of ethylene. To this reaction mixture is then added a stream of gaseous chlorine with temperature control to maintain a temperature not exceeding 100° C. At the end of 16 hours a chlorinated polyethylene of chlorine content of about 60% chlorine is obtained.

*Example 8*

Example 7, when repeated using $C_2Cl_3F_3$ as the dispersing medium for the polymerization and subsequently as the chlorination solvent, gives similar results. However, the chlorinated polyethylene has a higher viscosity.

What is claimed is:

1. An improved process for the preparation of a halogenated polyolefin which comprises contacting an olefin selected from the group consisting of ethylene and propylene with a catalytic amount of a catalyst mixture of a titanium salt and an aluminum alkyl compound selected from the group consisting of aluminum trialkyl and aluminum alkyl sesquihalide, dispersed in a halogen-inert halogenated aliphatic liquid, to produce a reaction mixture containing a polymer of said olefin, contacting said reaction mixture with a halogenating agent selected from the group consisting of chlorine, bromine, and a mixture of chlorine and $SO_2$ at a temperature of from about 40–150° C. and at a pressure of up to about 30 atmospheres, whereby the aforesaid catalyst components are converted into halogen transfer agents, and recovering a halogenated polyolefin, thus employing the same halogen-inert dispersing medium for both the polymerization and the subsequent halogenation.

2. An improved process for the preparation of a halogenated polyolefin which comprises contacting an olefin selected from the group consisting of ethylene and propylene with a catalytic amount of a catalyst mixture of $TiCl_4$ and an aluminum alkyl compound selected from the group consisting of aluminum trialkyl and aluminum alkyl sesquihalide, dispersed in a halogen-inert halogenated aliphatic liquid, to produce a reaction mixture containing a polymer of said olefin, contacting said reaction mixture with a halogenating agent selected from the group consisting of chlorine, bromine, and a mixture of chlorine and $SO_2$ at a temperature of from about 40–150° C. and at a pressure of up to about 30 atmospheres, whereby the aforesaid catalyst components are converted into halogen transfer agents, and recovering a halogenated polyolefin, thus employing the same halogen-inert dispersing medium for both the polymerization and the subsequent halogenation.

3. The process of claim 2 wherein said reaction mixture containing said polymer is contacted with chlorine.

4. The process of claim 2 wherein said reaction mixture containing said polymer is contacted with a mixture of chlorine and sulfur dioxide.

5. The process of claim 2 wherein said olefin is ethylene.

6. The process of claim 2 wherein said organic liquid is carbon tetrachloride.

7. The process of claim 2 wherein said organic liquid contains fluorine and chlorine substituents and boils at a temperature below 200° C.

References Cited in the file of this patent

UNITED STATES PATENTS

| | | |
|---|---|---|
| 2,503,252 | Ernsberger | Apr. 11, 1950 |
| 2,695,899 | Becker et al. | Nov. 30, 1954 |
| 2,748,105 | Becker et al. | May 29, 1956 |
| 2,825,723 | Ballauf et al. | Mar. 4, 1958 |

FOREIGN PATENTS

| | | |
|---|---|---|
| 533,362 | Belgium | May 16, 1955 |